United States Patent
Hodges

(10) Patent No.: US 7,384,092 B2
(45) Date of Patent: Jun. 10, 2008

(54) SELECTIVELY RETRACTABLE ARMREST FOR A SLIDABLE DOOR

(75) Inventor: Richard J. Hodges, New Baltimore, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 11/535,610

(22) Filed: Sep. 27, 2006

(65) Prior Publication Data

US 2008/0073935 A1 Mar. 27, 2008

(51) Int. Cl.
*B60J 9/00* (2006.01)
(52) U.S. Cl. ...................... 296/153; 296/1.09
(58) Field of Classification Search ............... 296/153, 296/1.09
See application file for complete search history.

(56) References Cited

U.S. PATENT DOCUMENTS

| 2,026,016 | A | * | 12/1935 | Blood | 296/153 |
| 2,038,033 | A | * | 4/1936 | Flynn | 296/153 |
| 6,145,919 | A | * | 11/2000 | Mysliwiec et al. | 296/153 |
| 6,837,544 | B2 | * | 1/2005 | Bornchen et al. | 297/411.21 |
| 2004/0164577 | A1 | * | 8/2004 | Shabana et al. | 296/1.09 |

FOREIGN PATENT DOCUMENTS

| FR | 002813565 A1 * | 3/2002 |
| FR | 2878477 A1 * | 6/2006 |
| FR | 2888785 A1 * | 1/2007 |

* cited by examiner

*Primary Examiner*—Dennis H Pedder

(57) ABSTRACT

An armrest assembly for a vehicle is provided. The vehicle includes a body with a door having an inner panel. The door is preferably slidable with respect to the body and selectively openable with respect to the body by a selectively actuatable door handle assembly. The armrest assembly includes a selectively retractable armrest member pivotably mounted with respect to the inner panel and movable between a deployed position and a retracted position. The door handle assembly is operable to enable the selectively retractable armrest member to move from the deployed position to the retracted position when the door handle is actuated to provide clearance between the door and the body as the door opens. A vehicle incorporating the armrest assembly is also disclosed.

20 Claims, 4 Drawing Sheets

SELECTIVELY RETRACTABLE ARMREST FOR A SLIDABLE DOOR

TECHNICAL FIELD

The present invention relates to a selectively retractable armrest for a slidable vehicular door.

BACKGROUND OF THE INVENTION

Van or van-type vehicles may include a selectively openable door, which is slidably mounted with respect to a body of the vehicle. The door is typically mounted on tracks by which the door slides rearward to permit access to the interior of the vehicle. The clearance between the door and the body as the door slides from a closed to an open position is often minimized to reduce the space required to open the door. Therefore, it may be difficult to provide a fixed armrest mounted on the door due to the possibility of interference with the body as the door is moved to the open position.

SUMMARY OF THE INVENTION

An armrest assembly is provided for a vehicle including a body with a door having an inner panel, the door is slidable in relation to the body and selectively openable with respect to the body by a selectively actuatable door handle assembly operable to open the door. The armrest assembly includes a selectively retractable armrest member pivotably mounted to the inner panel and movable between a deployed position and a retracted position. The door handle assembly is operable to enable the selectively retractable armrest member to move from the deployed position to the retracted position when the door handle is actuated to provide clearance between the door and the body as the door opens.

The armrest assembly may include a rod member sufficiently configured to pivotably mount the selectively retractable armrest member with respect to the inner panel and a lock plate member mounted to the rod member. A locking pin operable to selectively engage the locking plate member to retain the selectively retractable armrest member in the deployed position may also be provided. At least one torsion spring may operate to bias the selectively retractable armrest member into the retracted position. The locking pin may be operatively connected to the selectively actuatable door handle assembly through one of a cable and linkage. The vehicle may further include an interior trim panel mounted to the inner panel. The armrest assembly may include an armrest housing mounted with respect to the interior trim panel and sufficiently configured to receive at least a portion of the armrest member when the armrest member is in the retracted position. A vehicle incorporating the disclosed armrest assembly is also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
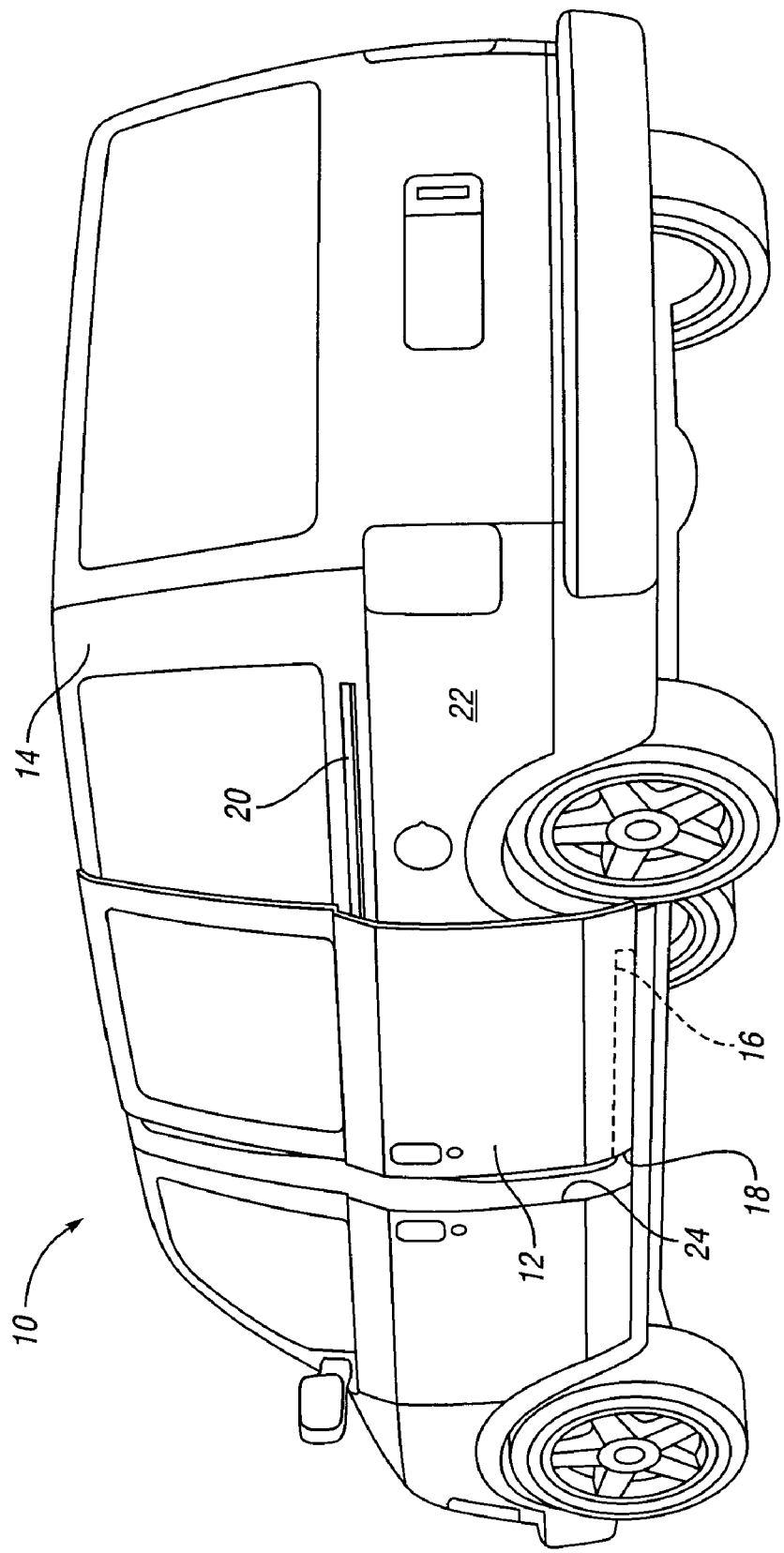
FIG. 1 is a perspective exterior view of a vehicle having a body and a selectively openable door slidably mounted thereto.

Referring to the drawings wherein like reference numbers correspond to like or similar components throughout the several figures, there is shown in FIG. 1 a vehicle 10, such as a van, having a selectively openable door 12 slidably mounted with respect to a body 14. The door 12 is slidable between an open and closed position via a floor track 16 mounted with respect to the floor sill 18 of the vehicle body 14 and a second track 20, which is mounted with respect to an outer sidewall 22 of the body 14. It should be noted that the door 12, as shown in FIG. 1, is in a partially open position, thereby exposing a jamb 24 defined by the body 14. It should also be noted that as the door 12 slides along the sidewall 22 of the vehicle body 14, the clearance between the door 14 and sidewall 22 is typically minimized.

Figure 2:
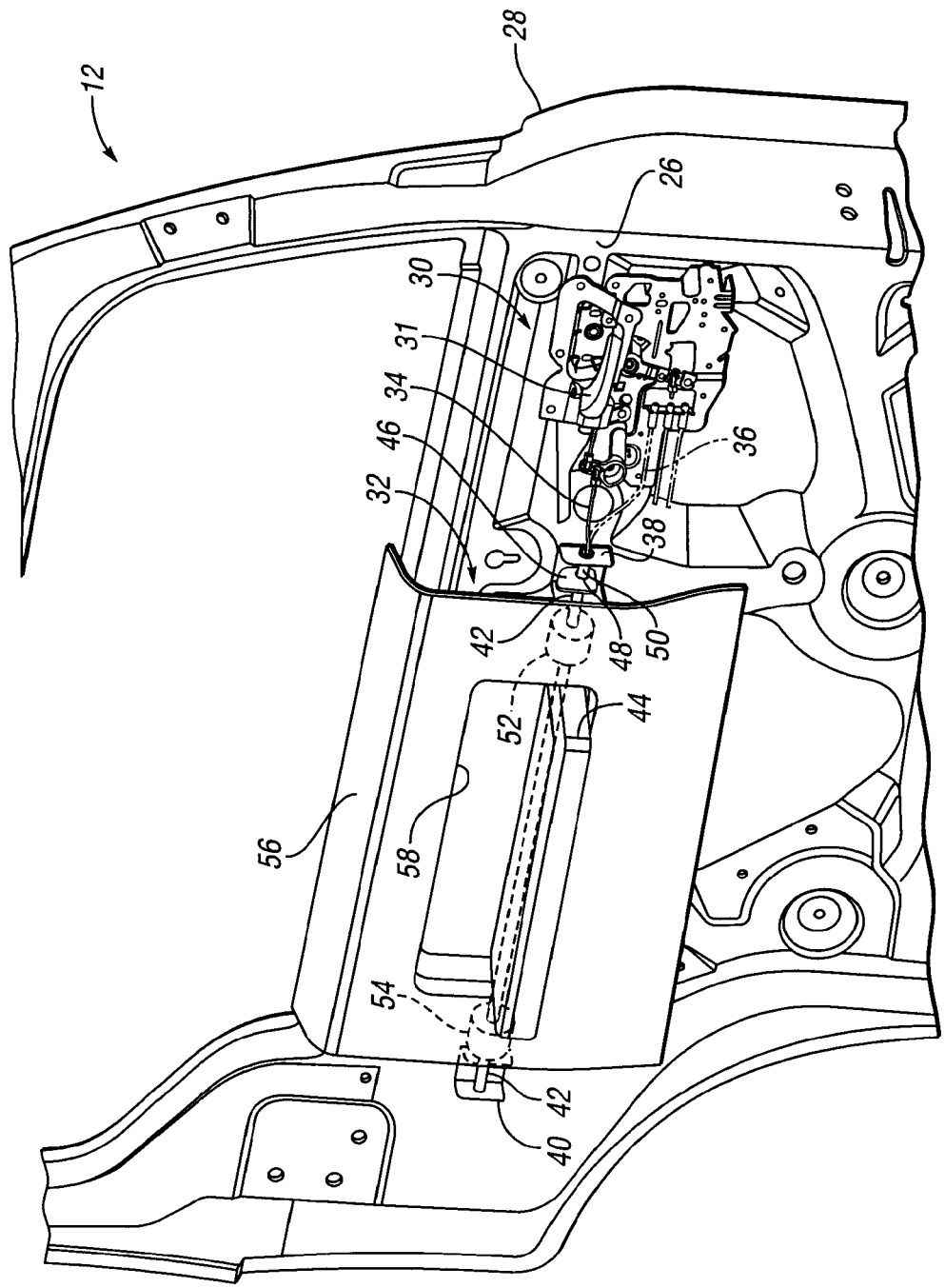
FIG. 2 is a perspective interior view of a portion of the door of FIG. 1 illustrating an armrest assembly having a selectively retractable arm rest member, pivotably mounted with respect to an inner panel of the door, in a deployed position and a door handle assembly for enabling the selective retraction of the arm rest member.

Referring to FIG. 2, and with continued reference to FIG. 1, there is shown a perspective interior view of the door 12. The door 12 includes an inner panel 26 mounted with respect to an outer panel 28. A selectively actuatable door handle assembly 30, having a movable door handle 31, is mounted with respect to the inner panel 26 and is operatively connected with an armrest assembly 32 through a linkage 34. Those skilled in the art will recognize that a cable 36, shown in phantom, may be used in lieu of the linkage 34 should design requirements, such as mounting position of the door handle assembly 30 with respect to the armrest assembly 32, dictate. The door handle assembly 30 is selectively actuatable to unlatch the door 12 thereby allowing or enabling the door 12 to move or slide from the closed position to the open position.

Figure 3:
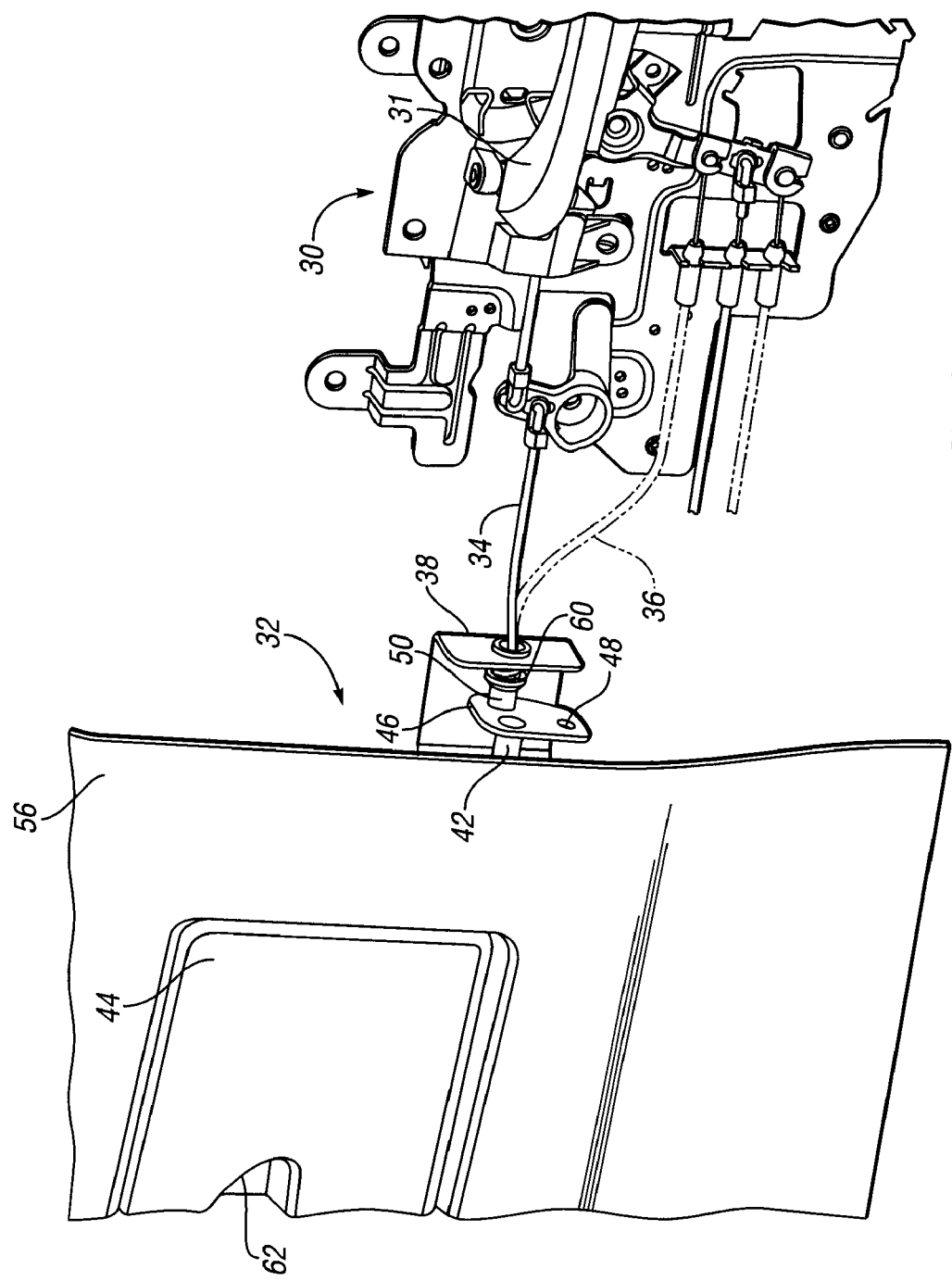
FIG. 3 is a perspective interior view of a portion of the armrest assembly and door handle assembly of FIG. 2 with the selectively retractable armrest member in a retracted position.

The armrest assembly 32 includes a first and second bracket member 38 and 40, respectively, mounted with respect to the inner panel 26 and sufficiently configured to receive a rod 42. The first and second bracket members 38 and 40 cooperate with the rod 42 to pivotably mount a selectively retractable armrest member 44 with respect to the inner panel 26. The armrest member 44 is movable between a deployed position, as shown in FIG. 2, and a retracted position, as shown in FIG. 3. A locking plate 46 is fixed to one end of the rod 42 for unitary rotation therewith. The locking plate 46 defines a bore or hole 48 that is sufficiently configured to selectively receive at least a portion of a locking pin 50. The locking plate 46 and the locking pin 50 cooperate to selectively lock or maintain the armrest member 44 in the deployed position. A first torsion spring 52 and a second torsion spring 54 are coaxially disposed with respect to the rod 42 and operate to bias the armrest member 44 into the retracted position. An interior trim panel 56 is preferably mounted with respect to the inner panel 26. The interior trim panel 56 has an armrest housing 58 mounted thereto or formed thereon. The armrest housing 58 is sufficiently configured to receive at least a portion of the armrest member 44 therein when the armrest member 44 is in the retracted position.

Referring now to FIG. 3, there is shown a perspective view of a portion of the door handle assembly 30 and the armrest assembly 32, shown in FIG. 2. As indicated hereinabove, the armrest member 44 is shown in the retracted position. With the armrest 44 in the retracted position, the locking plate 46 is rotated or positioned to prevent engagement of the locking pin 50 with the hole 48. It should be understood that as the locking plate 46 rotates such that the hole 48 is indexed with the locking pin 50, such as when the armrest 44 is moved from the retracted position to the deployed position, a spring 60 will bias the locking pin 50 into engagement with the hole 48 defined by locking plate 46. Additionally, either the linkage 34 or the cable 36, if so equipped, operate to bias or pull the locking pin 50 out of engagement with the hole 48 defined by the locking plate 46 when the door handle assembly 30 is actuated by moving or pulling the door handle 31. The armrest member 44 defines a handle or handhold 62, a portion of which is shown in FIG. 2.

Figure 4:
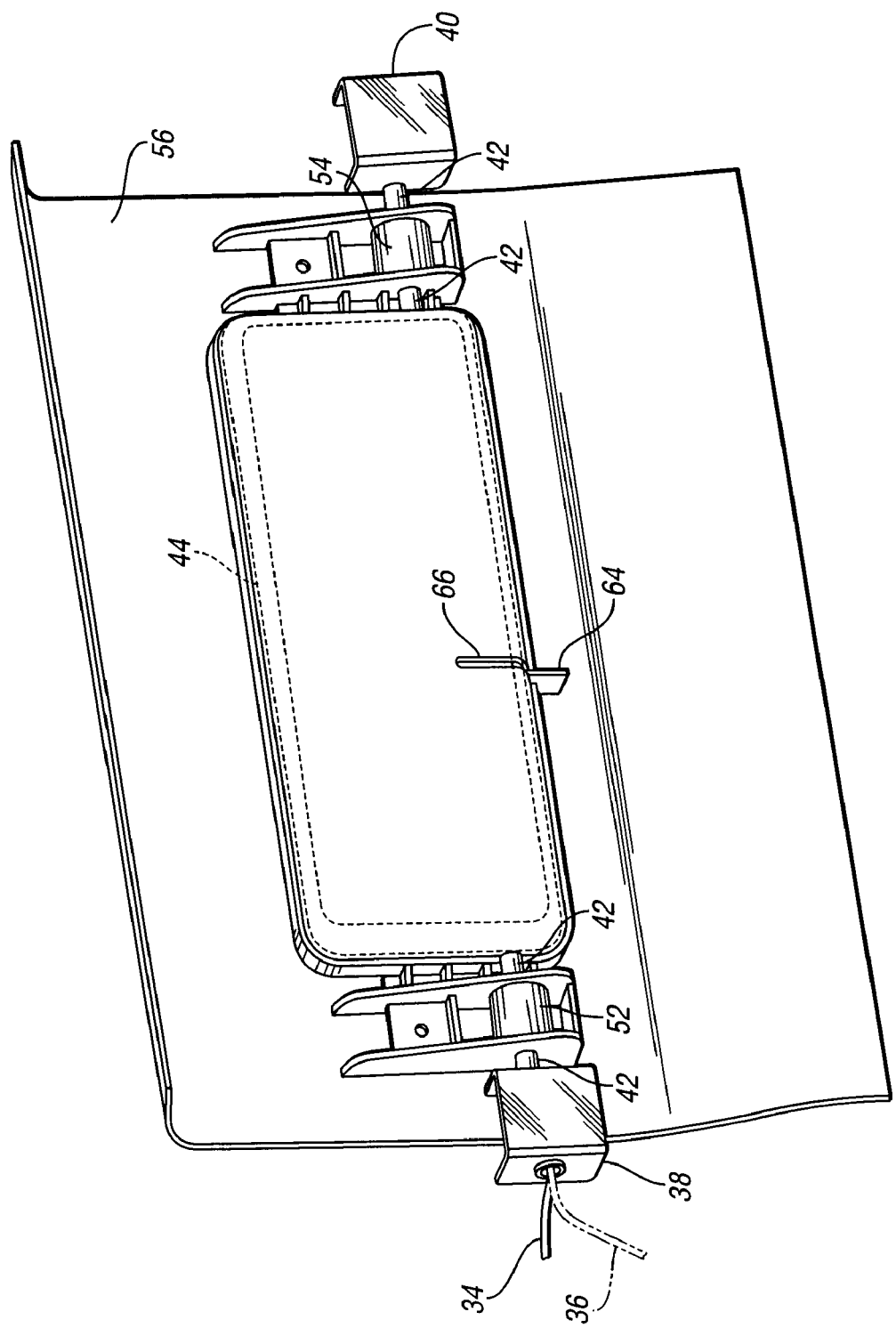
FIG. 4 is a perspective view of the armrest assembly of FIGS. 2 and 3 illustrating the backside of the inner trim panel of the armrest assembly.

Referring to FIG. 4, there is shown a perspective view of the backside of the interior trim panel 56 illustrating the inner panel side of the armrest assembly 32 of FIGS. 2 and 3. FIG. 4 further illustrates the first and second torsion springs 52 and 54 that operate to bias the armrest member 44 into the retracted position when the door handle 31 is pulled to disengage the locking pin 50. A tab member 64 is fixed to the armrest member 44 and is received at least partially within a slot 66 defined by the armrest housing 58 and/or the inner panel 26. The tab member 64 and slot 66 cooperate to limit the over travel of the armrest member 44 when in the deployed position.

The operation of the armrest assembly 32 can best be understood with reference to FIGS. 1, 2, 3, and 4. With the door 12 in the closed position, the vehicle occupant may move the armrest member 44 into the deployed position by pulling on the handhold 62. As the armrest member 44 moves into the deployed position the locking plate 46 rotates to index the hole 48 with the locking pin 50. Once indexed, the bias force of the spring 60 will urge the locking pin 50 into engagement with the hole 48, thereby locking the armrest member 44 in the deployed position. While in the deployed position, the armrest member 44 is operable to provide the occupant with a comfortable seating arrangement.

When opening the door 12, the occupant will move or pull the door handle 31 to actuate the door handle assembly 30. By actuating the door handle assembly 30, the linkage 34 or cable 36 (if present) will urge the locking pin 50 against the bias force of spring 60 to move the locking pin 50 out of engagement with the locking plate 46 thereby allowing the locking plate 46 and the shaft 42 to rotate. The first and second torsion springs 52 and 54 will bias the armrest member 44 into the retracted position to provide clearance between the door 12 and the sidewall 22 as the door 12 moves from the closed position to the open position. By mounting the armrest assembly 32 with respect to the door 12, the tight clearances between the door 12 and the outside of the adjacent body 14 can be maintained, while providing a functional arm rest member 44 for occupant comfort.

While the best modes for carrying out the invention have been described in detail, those familiar with the art to which this invention relates will recognize various alternative designs and embodiments for practicing the invention within the scope of the appended claims.

The invention claimed is:

1. An armrest assembly for a vehicle including a body with a door having an inner panel, the door being slidable with respect to the body and selectively openable with respect to the body by a selectively actuatable door handle assembly operable to open the door, the armrest assembly comprising:
    a selectively retractable armrest member movable between a deployed position and a retracted position;
    a rod member sufficiently configured to pivotably mount said selectively retractable armrest member with respect to the inner panel; and
    a lock plate member mounted directly to said rod member;
    wherein the door handle assembly is operable to enable said selectively retractable armrest member to move from said deployed position to said retracted position when the door handle is actuated to provide clearance between the door and the body as the door opens.

2. The armrest assembly of claim 1, further comprising:
    a locking pin operable to selectively engage said locking plate member locking pin to retain said selectively retractable armrest member in said deployed position.

3. The armrest assembly of claim 1, further comprising at least one torsion spring operable to bias said selectively retractable armrest member into said retracted position.

4. The armrest assembly of claim 2, wherein said locking pin is operatively connected to the selectively actuatable door handle assembly through one of a cable and linkage.

5. The armrest assembly of claim 1, wherein the vehicle further includes an interior trim panel mounted with respect to the inner panel, and wherein the armrest assembly includes an armrest housing mounted with respect to the interior trim panel, wherein the armrest housing is sufficiently configured to receive at least a portion of said armrest member when said armrest member is in said retracted position.

6. A vehicle comprising:
    a body;
    a door slidably mounted and selectively openable with respect to said body;
    an inner panel mounted with respect to said door;
    a door handle assembly selectively actuatable to selectively open said door; and
    an armrest assembly including a selectively retractable armrest member movable between a deployed position and a retracted position; a rod member sufficiently configured to pivotably mount said selectively retractable armrest member with respect to said inner panel; a lock plate member mounted directly to said rod member; and a locking pin operable to selectively engage said locking plate member to retain said selectively retractable armrest member in said deployed position;
    wherein said door handle assembly is operable to enable said selectively retractable armrest member to move from said deployed position to said retracted position when said door handle assembly is actuated to open said door.

7. The vehicle of claim 6, wherein said lock plate member defines one of a hollow and a hole that is sufficiently configured to selectively receive at least a portion of said locking pin to retain said selectively retractable armrest member in said deployed position.

8. The vehicle of claim 6, wherein said armrest assembly further includes at least one torsion spring operable to bias said selectively retractable armrest member into said retracted position.

9. The vehicle of claim 6, wherein said locking pin is operatively connected to said selectively actuatable door handle assembly through one of a cable and linkage.

10. The vehicle of claim 6, further comprising:
an interior trim panel mounted with respect to said inner panel;
wherein said armrest assembly includes an armrest housing mounted with respect to said interior trim panel; and
wherein said armrest housing is sufficiently configured to receive said armrest member when said armrest member is in said retracted position.

11. A vehicle comprising:
a body;
a door slidably mounted and selectively openable with respect to said body;
an inner panel mounted with respect to said door;
a door handle assembly selectively actuatable to selectively open said door;
an armrest assembly including:
    a selectively retractable armrest member pivotably mounted with respect to said inner panel and movable between a deployed position and a retracted position;
    a rod member sufficiently configured to pivotably mount said selectively retractable armrest member with respect to said inner panel;
    a locking plate member mounted with respect to said rod member for unitary rotation therewith;
    a locking pin operable to selectively engage said locking plate to retain said selectively retractable armrest member in said deployed position; and
wherein said door handle assembly is operable to enable said selectively retractable armrest member to move from said deployed position to said retracted position when said door handle assembly is actuated to open said door.

12. The vehicle of claim 11, wherein said armrest assembly further includes at least one torsion spring operable to bias said selectively retractable armrest member into said retracted position.

13. The vehicle of claim 11, wherein said locking pin is operatively connected to said door handle assembly through one of a cable and linkage.

14. The vehicle of claim 11, further comprising:
an interior trim panel mounted with respect to said inner panel;
wherein said armrest assembly includes an armrest housing mounted with respect to said interior trim panel; and
wherein said armrest housing is sufficiently configured to receive said armrest member when said armrest member is in said retracted position.

15. The vehicle of claim 12, wherein said at least one torsion spring is coaxially disposed with respect to said rod member.

16. The vehicle of claim 14, wherein said armrest member includes a tab portion extending therefrom and operable to engage said interior trim panel to limit the movement of said armrest member.

17. The armrest assembly of claim 2, wherein said locking pin is operatively connected to the selectively actuatable door handle assembly through a cable.

18. The armrest assembly of claim 2, wherein said lock plate member defines one of a hollow and a hole that is sufficiently configured to selectively receive at least a portion of said locking pin to retain said selectively retractable armrest member in said deployed position.

19. The vehicle of claim 6, wherein said locking pin is operatively connected to said door handle assembly through a cable.

20. The vehicle of claim 11, wherein said locking plate member defines one of a hollow and a hole that is sufficiently configured to selectively receive at least a portion of said locking pin to thereby retain said selectively retractable armrest member in said deployed position.

\* \* \* \* \*